(12) United States Patent
Shrestha et al.

(10) Patent No.: US 12,035,182 B2
(45) Date of Patent: Jul. 9, 2024

(54) CELL RESELECTION DURING GATEWAY AND SATELLITE SWITCH

(71) Applicant: QUALCOMM Incorporated, San Diego, CA (US)

(72) Inventors: Bharat Shrestha, San Diego, CA (US); Xiao Feng Wang, San Diego, CA (US); Ayan Sengupta, San Diego, CA (US); Umesh Phuyal, San Diego, CA (US); Alberto Rico Alvarino, San Diego, CA (US); Mungal Singh Dhanda, Slough (GB); Liangping Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 17/475,150

(22) Filed: Sep. 14, 2021

(65) Prior Publication Data
US 2022/0110029 A1 Apr. 7, 2022

Related U.S. Application Data

(60) Provisional application No. 63/086,413, filed on Oct. 1, 2020.

(51) Int. Cl.
| | | |
|---|---|---|
| *H04W 4/00* | (2018.01) | |
| *H04B 7/185* | (2006.01) | |
| *H04W 36/00* | (2009.01) | |
| *H04W 36/06* | (2009.01) | |

(52) U.S. Cl.
CPC .... *H04W 36/0061* (2013.01); *H04B 7/18513* (2013.01); *H04W 36/0072* (2013.01); *H04W 36/06* (2013.01)

(58) Field of Classification Search
CPC ............ H04W 36/06; H04W 36/0055; H04W 36/0061; H04W 36/0072; H04B 7/18513
See application file for complete search history.

(56) References Cited

U.S. PATENT DOCUMENTS

| | | | | |
|---|---|---|---|---|
| 10,447,375 | B1 * | 10/2019 | Padhy | .................... H04B 7/088 |
| 10,917,843 | B1 * | 2/2021 | Kuester | .......... H04W 36/00835 |
| 2017/0230104 | A1 * | 8/2017 | Purkayastha | ...... H04B 7/18541 |
| 2019/0007129 | A1 * | 1/2019 | Vargas | ................. H04B 7/1858 |
| 2019/0245614 | A1 * | 8/2019 | Lucky | .................. H04B 7/2041 |

(Continued)

FOREIGN PATENT DOCUMENTS

WO    2020092561 A1    5/2020

OTHER PUBLICATIONS

International Search Report and Written Opinion—PCT/US2021/050442—ISA/EPO—Dec. 23, 2021.

(Continued)

*Primary Examiner* — Elisabeth Benoit Magloire
(74) *Attorney, Agent, or Firm* — ArentFox Schiff LLP

(57) ABSTRACT

A user equipment may be configured to perform cell reselection during a gateway or satellite switch. In some aspects, the user equipment may select a current cell of a satellite device in a radio access network (RAN) and receive, from the satellite device, cell reselection information for identifying a destination cell for selection in response to a link modification. Further, the user equipment may select, via a cell reselection process, the destination cell based on the cell reselection information.

26 Claims, 11 Drawing Sheets

(56) References Cited

U.S. PATENT DOCUMENTS

| | | | | |
|---|---|---|---|---|
| 2021/0274414 A1* | 9/2021 | Määttanen | ............ | H04W 76/11 |
| 2021/0385675 A1* | 12/2021 | Määttänen | ......... | H04B 7/18539 |
| 2022/0141891 A1* | 5/2022 | Masini | ............... | H04B 7/18563 |
| | | | | 370/316 |
| 2023/0072679 A1* | 3/2023 | Lauridsen | .......... | H04B 7/18541 |

OTHER PUBLICATIONS

ZTE Corporation, et al., "Consideration on System Information Update in NTN", 3GPP TSG-RAN WG2 Meeting #107, R2-1909264_Consideration on System Information Update in NTN, 3rd Generation Partnership Project (3GPP), Mobile Competence Centre, F-06921 Sophia-Antipolis Cedex, vol. RAN WG2, No. Prague, Czech, Aug. 26, 2019-Aug. 30, 2019, 5 Pages, Aug. 15, 2019, XP051767067, Retrieved from the Internet: URL: http://www.3gpp.org/ftp/tsg_ran/WG2_RL2/TSGR2_107/Docs/R2-1909264.zip [retrieved on Aug. 15, 2019] the whole document.

* cited by examiner

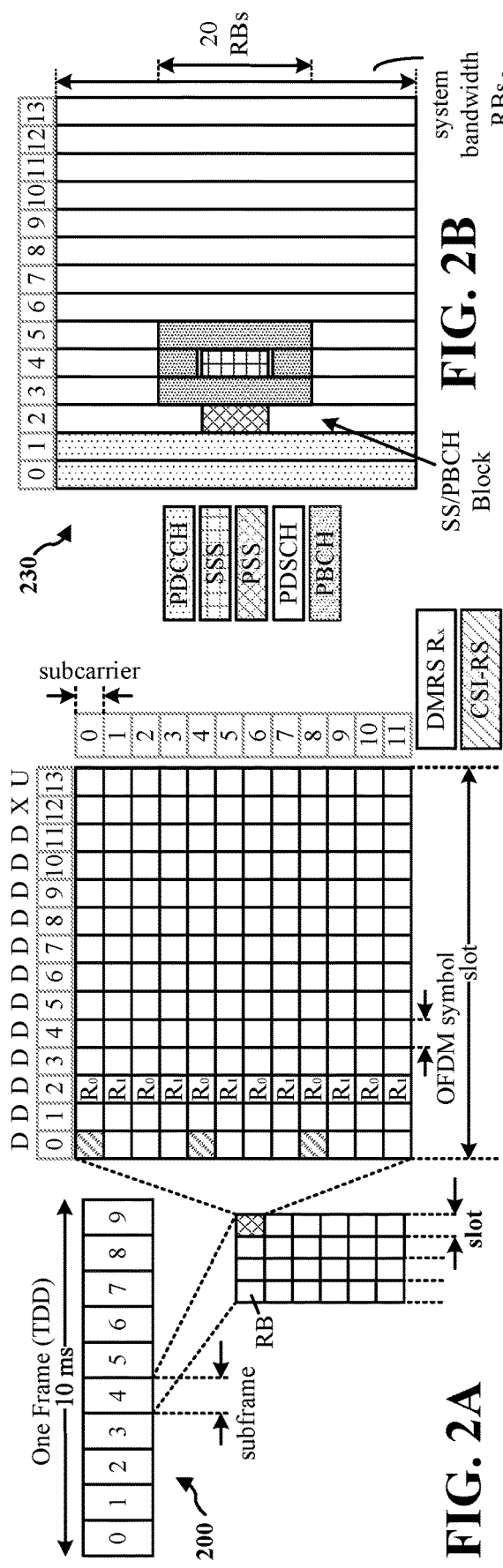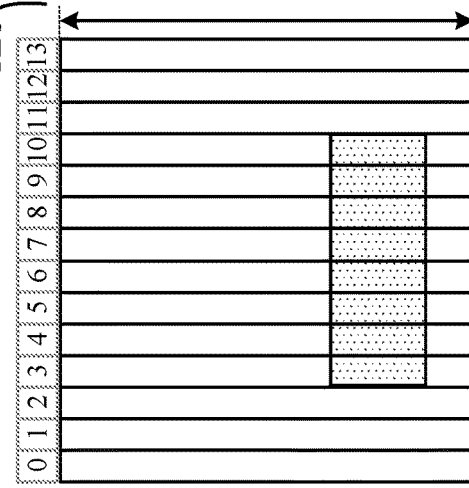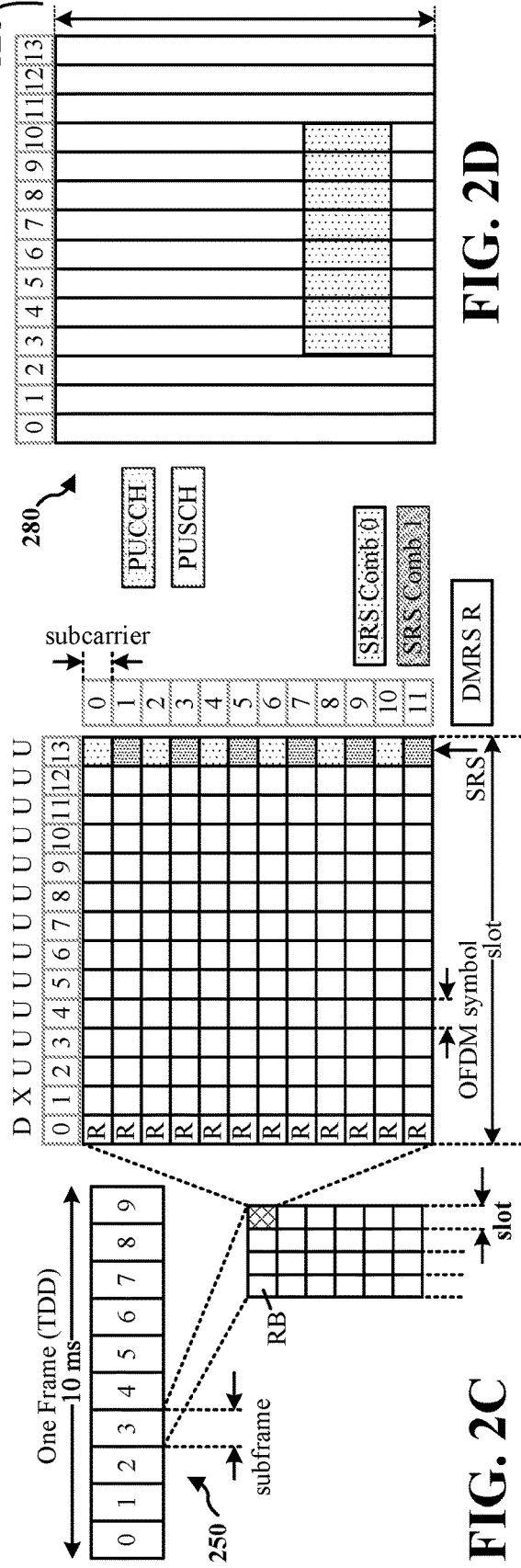

CELL RESELECTION DURING GATEWAY AND SATELLITE SWITCH

CROSS-REFERENCE TO RELATED APPLICATION

This application claims priority to U.S. Application No. 63/086,413, entitled "CELL RESELECTION DURING GATEWAY AND SATELLITE SWITCH," filed on Oct. 1, 2020, the disclosure of which is incorporated by reference herein in its entirety.

BACKGROUND

Technical Field

The present disclosure relates generally to wireless communication, and more particularly, to cell reselection during a gateway and/or satellite switch.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a user equipment (UE) comprising selecting a current cell of a satellite device in a radio access network (RAN) and receiving, from the satellite device, cell reselection information for identifying a destination cell for selection in response to a link modification.

The disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

An example implementation includes a method of wireless communication at a satellite device comprising initializing a current cell of a RAN using one or more beams, determining cell reselection information for identifying a destination cell for selection by the UE in response to a link modification, and sending the cell reselection information to the UE.

The disclosure also provides an apparatus (e.g., a satellite device) including a memory storing computer-executable instructions and at least one processor configured to execute the computer-executable instructions to perform the above method, an apparatus including means for performing the above method, and a non-transitory computer-readable medium storing computer-executable instructions for performing the above method.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame, in accordance with some aspects of the present disclosure.

FIG. 2B is a diagram illustrating an example of DL channels within a 5G/NR subframe, in accordance with some aspects of the present disclosure.

FIG. 2C is a diagram illustrating an example of a second 5G/NR frame, in accordance with some aspects of the present disclosure.

FIG. 2D is a diagram illustrating an example of UL channels within a 5G/NR subframe, in accordance with some aspects of the present disclosure.

DETAILED DESCRIPTION

Figure 1:
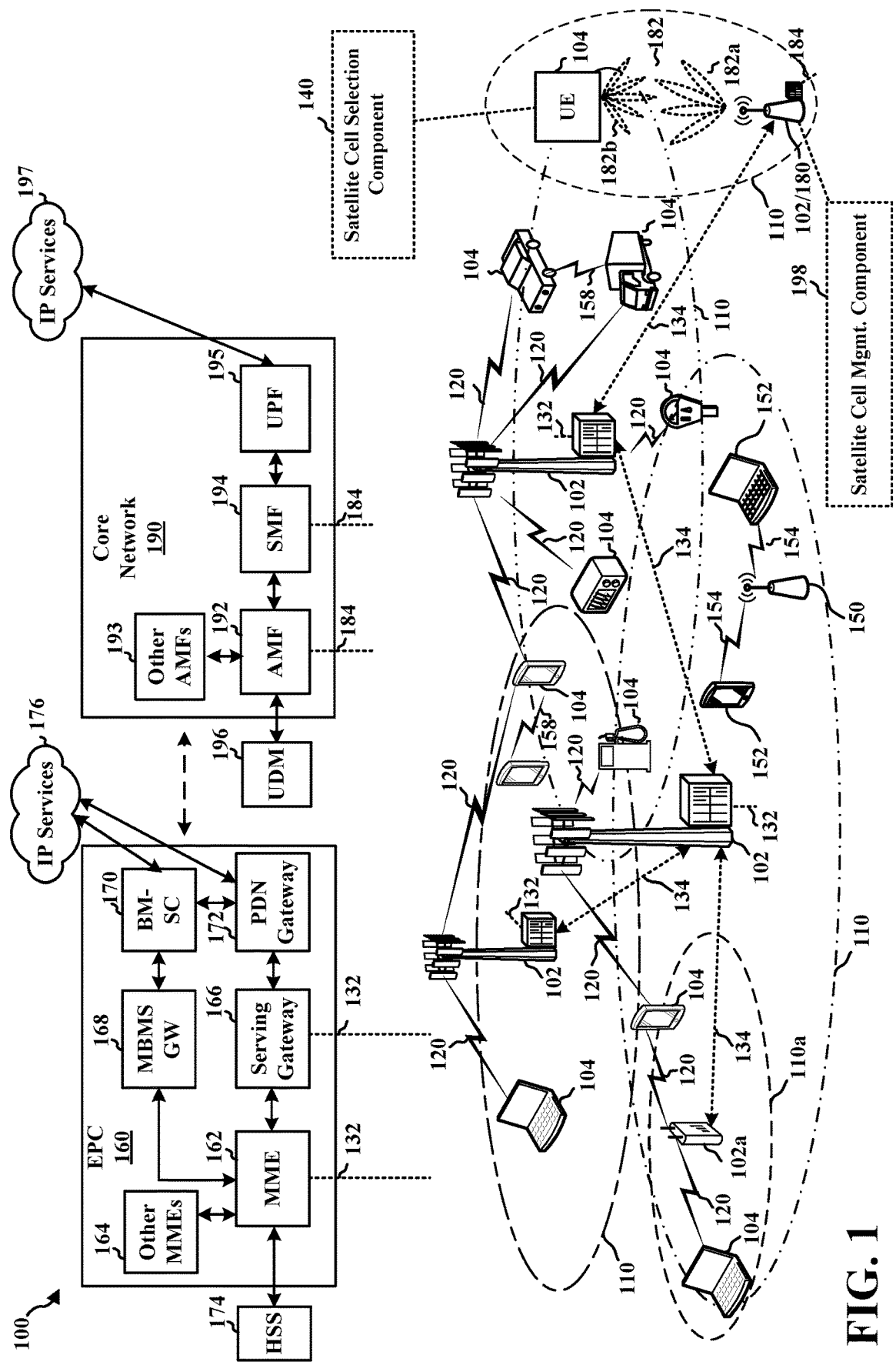
FIG. 1 is a diagram illustrating an example of a wireless communications system and an access network, in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various implementations relate generally to a procedure for cell reselection during a gateway and/or satellite switch. In some aspects, an idle UE may be configured to identify a cell to camp on and perform a cell reselection process to camp on the cell. In some aspects, one of the purposes of cell reselection is to ensure that the UE camps on/connects to the best cell in terms of radio conditions. In addition, as described herein, the UE may further identify the cell to camp on based on cell reselection information received from a satellite device. As used herein, the cell reselection information may inform the UE as to which cells may require performance of another cell reselection process in the near future, and the UE may be configured to minimize or reduce performance of cell reselection based on the cell reselection information.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

As described in detail herein, in some aspects, the base stations 102 may be satellite devices. As used herein, in some aspects, a "satellite device" may refer to a communication device orbiting a planet (e.g., earth). The satellite devices may be communicatively coupled to the access network 100 via one or more gateway devices. Further, the satellite devices may transmit and receive beams to provide cell coverage to UEs 104. As such, the satellite devices may include a space navigation platform for satellite operation and a communication payload (e.g., antennas, transponders, etc.). Additionally, the satellite devices may be low earth orbit (LEO) satellite devices, medium earth orbit (MEO) satellite devices, and/or geostationary (GEO) satellite devices. In an aspect, one or more UEs 104 may include a satellite cell selection component 140 configured to perform a cell reselection process based on cell reselection information, and the satellite devices may be configured to determine the cell reselection information.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available. The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (416 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182a. The UE 104 may receive the beamformed signal from the base station 180 in one or more receive directions 182b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a satellite phone, a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIGS. 2A-2D include example diagrams 200, 230, 250, and 280 illustrating examples structures that may be used for wireless communication by the base station 102 and the UE 104, e.g., for 5G NR communication. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. For slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu}*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more CCE, each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
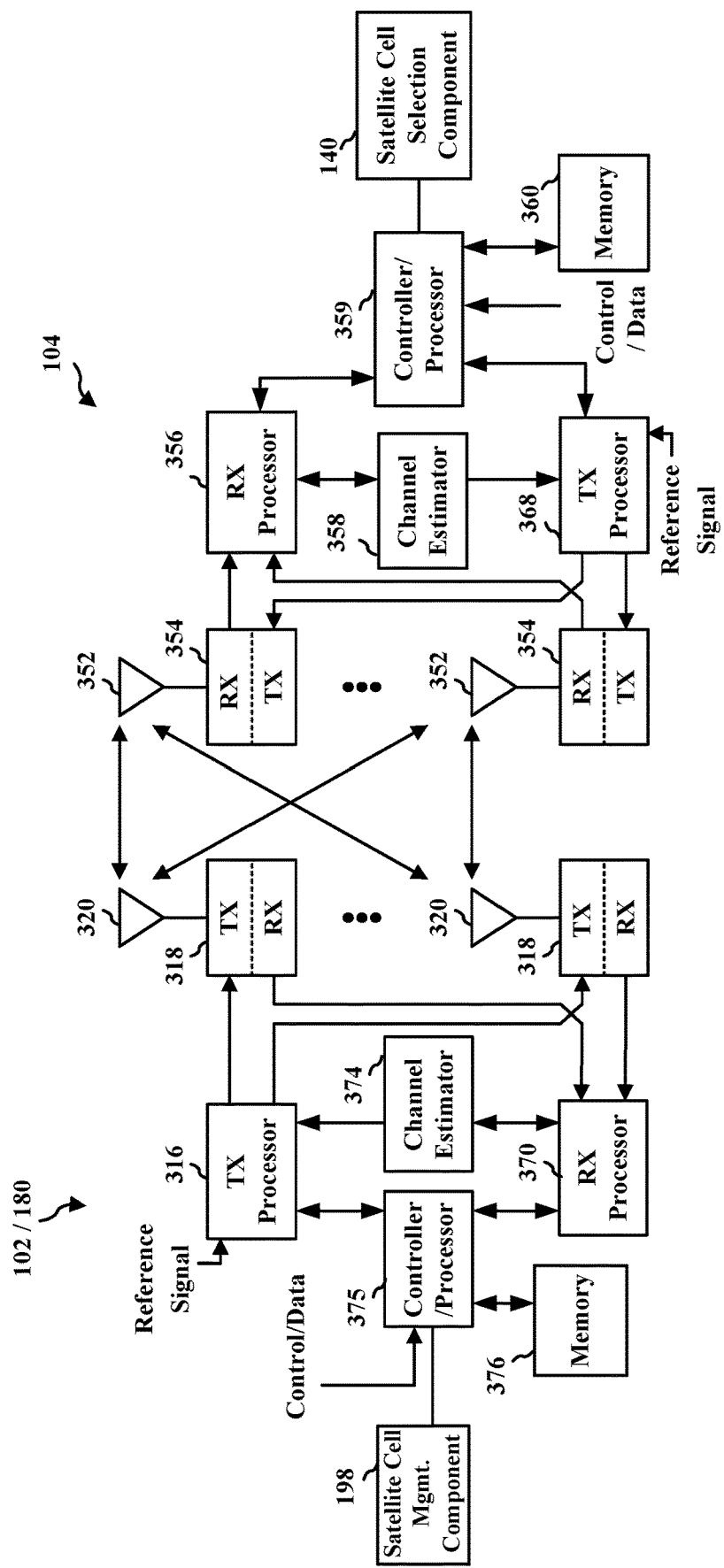
FIG. 3 is a diagram illustrating an example of a base station and a user equipment (UE) in an access network, in accordance with some aspects of the present disclosure.

FIG. 3 is a block diagram of a base station 102/180 (e.g., a satellite device) in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356.

The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 102/180, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK or NACK protocol to support HARQ operations.

In the UE 104, at least one of the TX processor 368, the RX processor 356, and the controller/processor 359 may be configured to perform aspects in connection with the satellite cell selection component 140 of FIG. 1.

In the base station 102/180, at least one of the TX processor 316, the RX processor 370, and the controller/processor 375 may be configured to perform aspects in connection with satellite cell management component 198 of FIG. 1.

In some instances, a satellite access system may be incorporated into a communication network. For example, a communication network may employ a satellite device to provide communication access to unserved or underserved geographical areas, or offload traffic in a terrestrial network. As such, the communication system may include a feeder link between the satellite device and a gateway that communicatively couples the satellite to the communication network, and one or more service links between the satellite device and UEs that receive communication access via the satellite device. Further, operation of the satellite device may cause satellite handover (i.e., service link modifications) and/or gateway changes (i.e., feeder link modifications). In response to the operation of the satellite devices, the UEs may perform cell reselection to select a cell of the satellite device or another more appropriate satellite device to camp on. However, frequent cell reselections may waste battery capacity, thereby having an adverse effect on the operation of the UEs. The present disclosure provides techniques for cell reselection during a gateway and/or satellite switch. As described in detail herein, a UE may be configured to minimize or reduce the frequency of cell reselection based on cell reselection information received from a satellite device.

In some aspects, the cell selection information may be used to determine a beam of a satellite device and/or a radio cell of a satellite device that should be selected by the UE to minimize or reduce the amount of cell reselections performed by the UE. In other words, selection of the beam and/or radio cell should delay performance of cell reselection by de-prioritizing camping on beams and radio cells most likely to require performance of cell reselection in the near future. Further, in some aspects, the satellite device may send the cell reselection information within a SIB, a MIB, a SSB, and/or dedicated RRC signaling. Accordingly, the present techniques enable a UE to perform intelligent cell reselection within a satellite access network, thereby reducing battery expenditure and processing load of the UE.

Referring to FIGS. 4-11, in one non-limiting aspect, a system 400 is configured to minimize cell reselection resulting from a gateway and/or satellite switches in a communication system including satellite devices.

Figure 4:
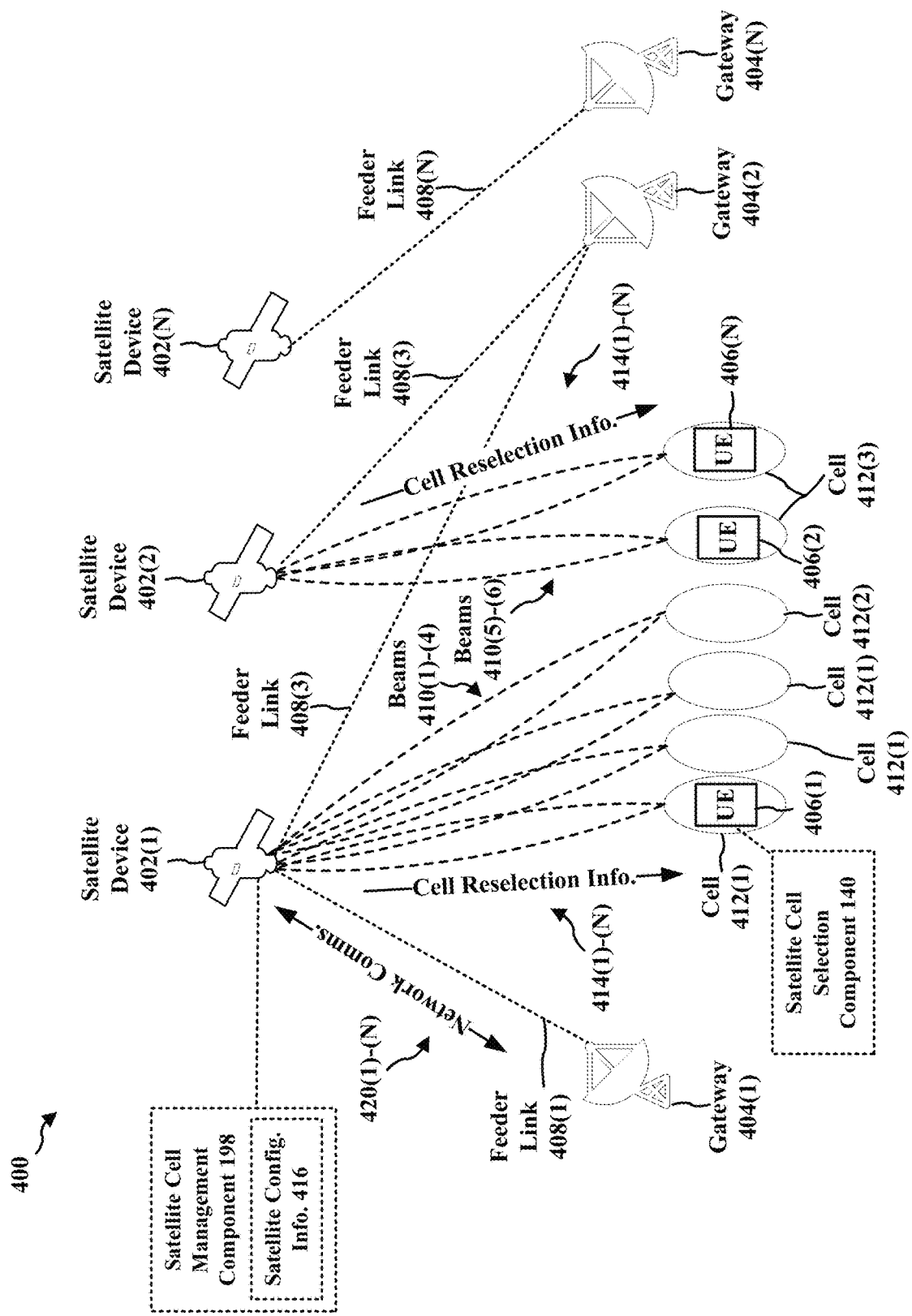
FIG. 4 is a diagram illustrating example communications and components of satellite devices and UEs, in accordance with some aspects of the present disclosure.

FIG. 4 is a diagram illustrating example communications and components of satellite devices and UEs. As illustrated in FIG. 4, the system 400 may include a plurality of satellite devices 402(1)-(N), a plurality of gateways 404(1)-(N), and a plurality of UEs 406(1)-(N) (e.g., the UE 102). Each satellite device 402 may establish one or more feeder linkers 408 with a gateway 404. As described herein, in some aspects, a "feeder link" may refer to a bi-directional communication link between a satellite device 402 and a gateway 404. For example, the satellite device 402(1) may establish a first feeder link 408(1) with the gateway 404(1) and a second feeder link 408(2) with the gateway 404(2). As another example, the satellite device 402(2) may establish a third feeder link 408(3) with the gateway 404(2). Further, the gateways 404(1)-(N) may communicatively couple with the satellite devices 402(1)-(N) to other parts of a communications network (e.g., a terrestrial network portion). For example, the satellite devices 402(1)-(N) may receive network communications 409(1)-(N) from the terrestrial network via the feeder links 408(1)-(N), and transmit network communications 409(1)-(N) to the terrestrial network via the feeder links 408(1)-(N).

In addition, the satellite devices 402(1)-(N) may form beams 410(1)-(N) based on the feeder links 408(1)-(N). For example, the feeder link 408(1) may correspond to the beams 410(1)-(3) formed by the satellite device 402(1), the feeder link 408(2) may correspond to the beams 410(4) formed by the satellite device 402(1), and the feeder link 408(2) may correspond to the beams 410(5)-(6) formed by the satellite device 402(2). In some aspects, the footprint of a beam 410 forms or extends a cell 412. For example, the beams 410(1)-(3) form the cell 412(1), the beam 410(4) forms the cell 412(2), and the beams 410(5)-(6) form the cell 412(3). Further, a satellite device 402 and a UE 406 may establish a service link when the UE 406 is connected to or selects a cell 412 via a beam 410. As used herein, in some aspects, "cell selection" may refer to a process that allows a UE to select a suitable cell where to camp on in order to access available services. Further, in some aspects, the "cell reselection" process allows a UE to select a more suitable cell and camp on it. As described herein, in some aspects, a "service link" may refer to a bi-directional communication link between a satellite device 402 and a UE 406.

In many instances, the movement of the satellite devices 402(1)-(N) (e.g., orbit around the earth) lead to varying coverage in time and space (i.e. geographic area). Further, the satellite devices 402(1)-(N) may periodically update the directions of the beams 410(1)-(N) to serve different geographical areas. As a result, the feeder links 408(1)-(N) and the service links are constantly being updated due to changes in proximity between the satellite devices and the gateways 404(1)-(N) and changes in proximity between the satellite devices 402(1)-(N) and the UEs 406(1)-(N). Additionally, when a UE 406 is in idle mode, the UE 406 may determine a cell 412 to camp on via cell selection or cell reselection in preparation for or in response to modifications to the feeder links 408(1)-(N) and the service links.

As described herein, the satellite devices 402(1)-(N) may determine cell reselection information 414(1)-(N) based on satellite configuration information 416. In some aspects, the satellite configuration information 416 may include coverage information identifying the coverage provided by each satellite device 402 throughout its orbit. For instance, the satellite configuration information 416 may indicate geographic locations covered by each of the satellite devices 402 at predefined time periods, timing information indicating the occurrence of gateway switches by the satellite devices 402, and/or timing information indicating the occurrence of a transition from providing coverage at a first geographic location to providing coverage at a second geographic location. In addition, the satellite devices 402(1)-(N) may periodically or dynamically send the cell reselection information 414(1)-(N) to the UEs 406(1)-(N) for performance of cell reselection processes, respectively. Further, the UEs 406(1)-(N) may perform cell reselection over the cells 412(1)-(N) provided by the beams 410(1)-(N) of the satellite devices 402(1)-(N) based on the cell reselection information 414(1)-(N). For example, the UE 406(1) may switch between the beams 410 of the same satellite device 402(1) (e.g., switch from beam 410(1) to beam 410(2)), or switch between beams 410 of different satellite devices 402 (e.g., switch from beam 410(1) to beam 410(5)).

In some aspects, the cell reselection information 414(1)-(N) may include configuration information identifying a predefined period of time to switch from a current cell 412(3) to a destination cell 412(2). For example, the configuration information may indicate a period of time to switch from a current cell 412(3) to a destination cell 412(2). Further, the period of time may correspond to the movement of the satellite devices 402(1)-(N). In particular, the period of time may correspond to when the satellite device 402(1) is performing a gateway switch from one gateway to another gateway (e.g., switching from the gateway 404(1) to the gateway 404(2)). As such, the configuration information may cause the UE 406(1) to select the destination cell 412(2) provided by the satellite device 402(1) based on the gateway 404(2) as opposed to another cell 412 provided by the satellite device 402(2) which would require cell reselection in the immediate future due to the movement of the satellite device 402(2) and/or a gateway switch performed by the satellite device 402(2) from the gateway 404(2) to another gateway 404. Further, in some aspects, the cell reselection information 414(1)-(N) may be provided to a UE 406 during a cell selection process or a cell reselection process. For example, the UE 406(1) may receive the cell reselection information 414(1) including the scheduling information during a cell selection of the cell 412(3).

In some aspects, the cell reselection information 414(1)-(N) may include barring information identifying a beam 410 or cell 412 that a UE 406 should not select during a cell reselection process. For example, the barring information may indicate that the UE 406(1) should not select (e.g., disqualify) beam 410(5) of the satellite device 402(2) given that the satellite device 402(2) may soon perform a gateway switch that would require cell reselection in the immediate future due to the movement of the satellite device 402(2) and/or a gateway switch performed by the satellite device 402(2) from the gateway 404(2) to another gateway 404. In some examples, the cell reselection information 414(1)-(N) may be MIBs including barring indicators. Further, individual beams 410 may be associated with individual MIBs, and an individual beam 410 may set the barring information via the MIB corresponding to the beam 410.

In some aspects, the cell reselection information 414(1)-(N) may trigger a cell reselection process or acquisition of a SIB that may be used to select a cell 412. For example, the cell reselection information 414(1)-(N) may be a DCI including a P-RNTI or another type of RNTI. In some other aspects, the cell reselection information 414(1)-(N) may include a gateway identifier associated with the destination cell 412 to be selected by the UE 406 during a cell reselection process. For example, the gateway identifier may identify the gateway 404(2) as a preferred gateway during the cell reselection process. In response, a UE 406 may prioritize a beam 410(5) or cell 412(3) associated with the identified gateway 404(2) during the cell reselection process.

In some aspects, the cell reselection information 414(1)-(N) may include mapping information identifying an association between a PCI or a frequency with a gateway identifier associated with the destination cell 412 to be selected by the UE 406 during a cell reselection process. The gateway identifier may identify the gateway 404(2) as a preferred gateway during the cell reselection process. In response, the UE 406(1) may prioritize a beam 410(5) or cell 412(3) associated with the identified gateway 404(2) during the cell reselection process. In some other aspects, the UE 406 may prioritize selection of a destination cell 412 belonging to the same gateway 404 as the current cell 412. Further, after cell reselection, a UE 406 may use an indication in a SIB1 whether the SIBs are different or the same between gateways. The list of cells/frequency can be indicated where SIB contents are same. This way, the UE 406 may not need to acquire all the SIBs as the gateway/gNB may be same.

In some aspects, the cell reselection information 414(1)-(N) may include warning information identifying a scheduled gateway switch from a first gateway 404 to a second gateway 404 that will cause a termination of a cell 412. For example, the warning information may identify that the satellite device 402(2) is terminating the cell 412(3) generated by the beam 410(5). Further, the warning information may identify another cell 412(2) for selection by the UE 406(2). In some instances, the satellite device 402(2) may send the warning information to the UE 406(2) during an awake period of a paging discontinuous reception (DRX) process. In some other instances, the satellite device 402(2) may send the warning information during a predefined reselection period. Further, in some aspects, the UE 406(2) may delay or deprioritize the selection of destination cell 412(2) based on the cell reselection information 414(1)-(N). For example, the UE 406(1) may delay or deprioritize selection of the cell 412(3) based on the cell reselection information 414(1)-(N) during the cell reselection process. In particular, the cell reselection information 414(1)-(N) may indicate the UE 406(1) should delay or deprioritize selection of the cell 412(3). In some aspects, the cell reselection information 414(1)-(N) may include timing information identifying a scheduled switch from a first gateway 404(1) to a second gateway 404(2) that will cause a reselection of a cell 412 belonging to a same serving satellite 402(1).

In some aspects, the cell reselection information 414(1)-(N) may include scheduling information identifying a period of time at which a UE 406 is instructed to forego monitoring for paging information and/or performing a cell reselection process. The period of time may correspond to a time at which a satellite device 402 is going to terminate a current cell 412 and initialize a destination cell 412. For example, the scheduling information may identify a period of time at which the satellite device 402(1) is terminating the cell 412(1) due to an impending a gateway switch by the satellite device 402(1) from the gateway 404(1) to the gateway 404(2). Further, the period of time may be aligned with a sleep period of DRX process.

As illustrated in FIG. 4, in some aspects, a satellite device 402 may include the satellite cell management component 198. The satellite cell management component 198 may be configured to determine the cell reselection information 414(1)-(N) based on the satellite configuration information 416. Further, the satellite devices 402(1)-(N) may send the cell reselection information 414(1)-(N) within a SIB, MIB, SSB, and/or dedicated RRC signaling. As further illustrated in FIG. 4, in some aspects, a UE 406 may include a satellite cell selection component 140. The satellite cell selection component 140 may be configured to receive the cell reselection information 414(1)-(N) and perform cell reselection based on the cell reselection information 414(1)-(N). More specifically, in some aspects, the satellite cell selection component 140 may be configured to minimize or reduce the frequency of cell reselection over the beams 410(1)-(N) and cells 412(1)-(N) based on the cell reselection information 414(1).

Figures 5A, 5B:
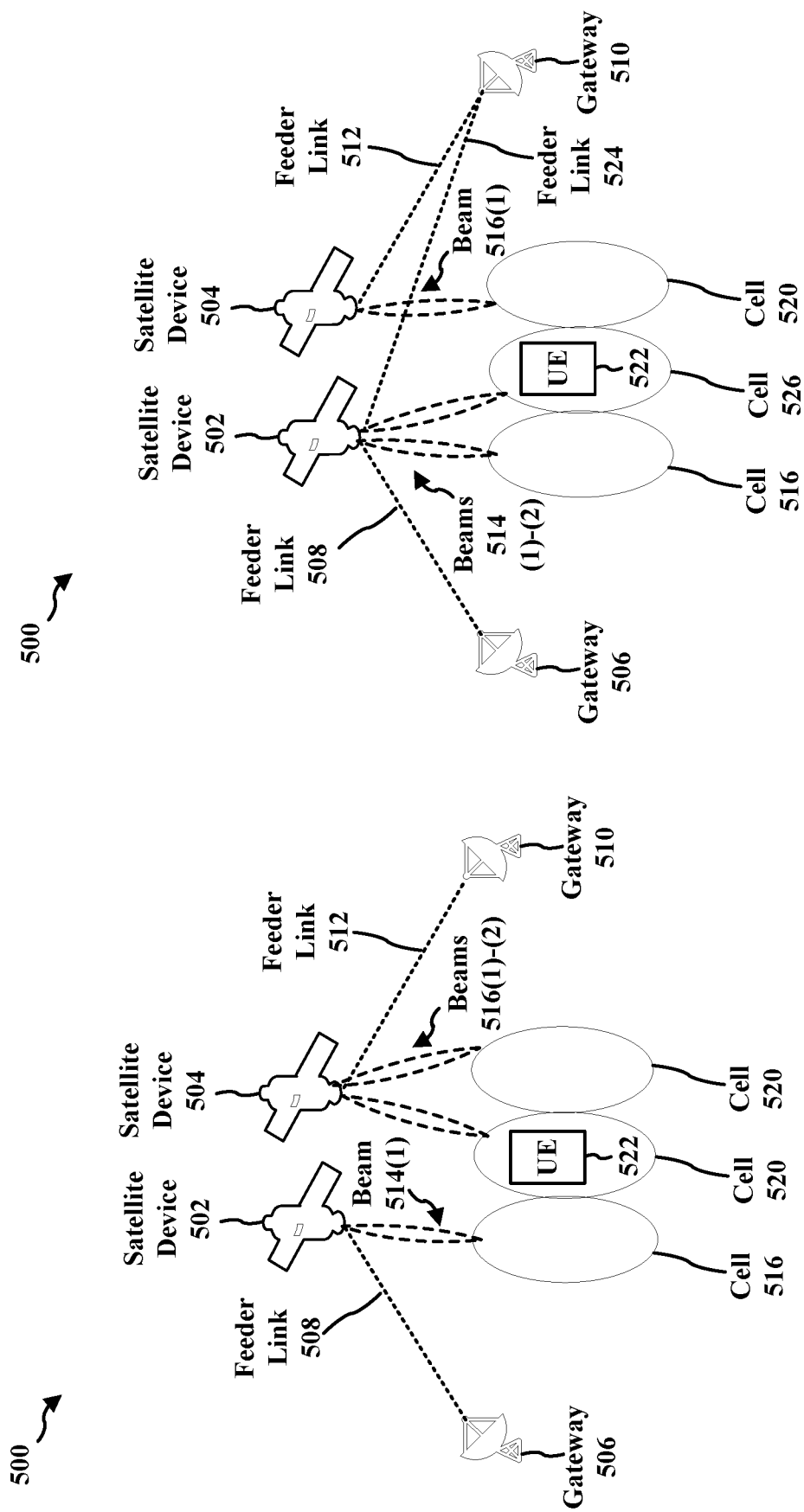
FIG. 5A is a diagram of an example of a wireless communication network 500 including fixed radio cells at a first instance in time, in accordance with some aspects of the present disclosure.
FIG. 5B is a diagram of an example of a wireless communication network 500 including fixed radio cells at a second instance in time, in accordance with some aspects of the present disclosure.

FIG. 5A is a diagram of an example of a wireless communication network 500 including fixed radio cells at a first instance in time, in accordance with some aspects of the present disclosure. As used herein, a "fixed radio cell" may refer to a radio cell generated by a satellite device employing steerable antenna technology to project a beam at particular geographic area for a fixed duration of time while in orbit around the planet. As used herein, a "moving radio cell" may refer to a radio cell that moves constantly as the source satellite device of the moving radio cell orbits around the planet. As illustrated in FIG. 5A, the wireless communication network 500 may include a satellite device 502 (e.g., the satellite device 402) and a satellite device 504 (e.g., the satellite device 402). Further, the satellite device 502 may be communicatively coupled a terrestrial network via a gateway 506 (e.g., the gateway 404). For example, the wireless communication network 500 may include a feeder link 508 between the satellite device 502 and the gateway 506. In addition, the satellite device 504 may be communicatively coupled to a terrestrial network via a gateway 510 (e.g., the gateway 404). For example, the wireless communication network 500 may include a feeder link 512 between the satellite device 504 and the gateway 510. Further, the satellite device 502 may form a beam 514(1) associated with the gateway 506 that provides the fixed radio cell 516, and the satellite device 504 may form beams 518(1)-(2) associated with the gateway 510 that provide the fixed radio cell 520. In addition, at a first instance in time, the UE 522 (e.g., the UE 406) may select the fixed radio cell 518 in a cell selection or reselection process.

FIG. 5B is a diagram of an example of a wireless communication network 500 including fixed radio cells at a second instance in time, in accordance with some aspects of the present disclosure. As illustrated in FIG. 5B, in response to movement of the satellite devices 502 and 504, the satellite device 502 may perform a soft feeder link switch. As used herein, "a soft feeder link switch" may refer to a gateway switch wherein the satellite device communicatively couples to a destination gateway before terminating the communicative coupling to a source gateway. Further, as used herein, "a hard feeder link switch" may refer to a gateway switch wherein the satellite device terminates the communicative coupling to a source gateway before communicatively couples to a destination gateway. For example, the satellite device 502 may additionally be communicatively coupled to the terrestrial network via the gateway 510. For example, the wireless communication network 500 may contemporaneously include the feeder link 508 between the satellite device 502 and the gateway 506, and a feeder link 524 between the satellite device 502 and the gateway 510. Further, the satellite device 502 may form a beam 514(2) associated with the gateway 510 that provides the fixed radio cell 526. As described in detail herein, the UE 522 may receive cell reselection information (e.g., the cell reselection information 414(1)-(N)), and select the fixed radio cell 526 to camp on based on the cell reselection information via a cell reselection process. In some aspects, the cell reselection information may include configuration information, barring information, and/or a DCI, as described in detail herein. In some other aspects, each fixed radio cell (e.g., the fixed radio cell 516) may correspond to a single beam (e.g., the beam 514(1)) or each satellite device (e.g., the satellite device 502) may generate a single fixed radio cell (e.g., the fixed radio cell 516). In these instances, the UE 522 may perform cell reselection using cell reselection information including configuration information and/or a DCI as described in detail herein.

Figures 6A, 6B:
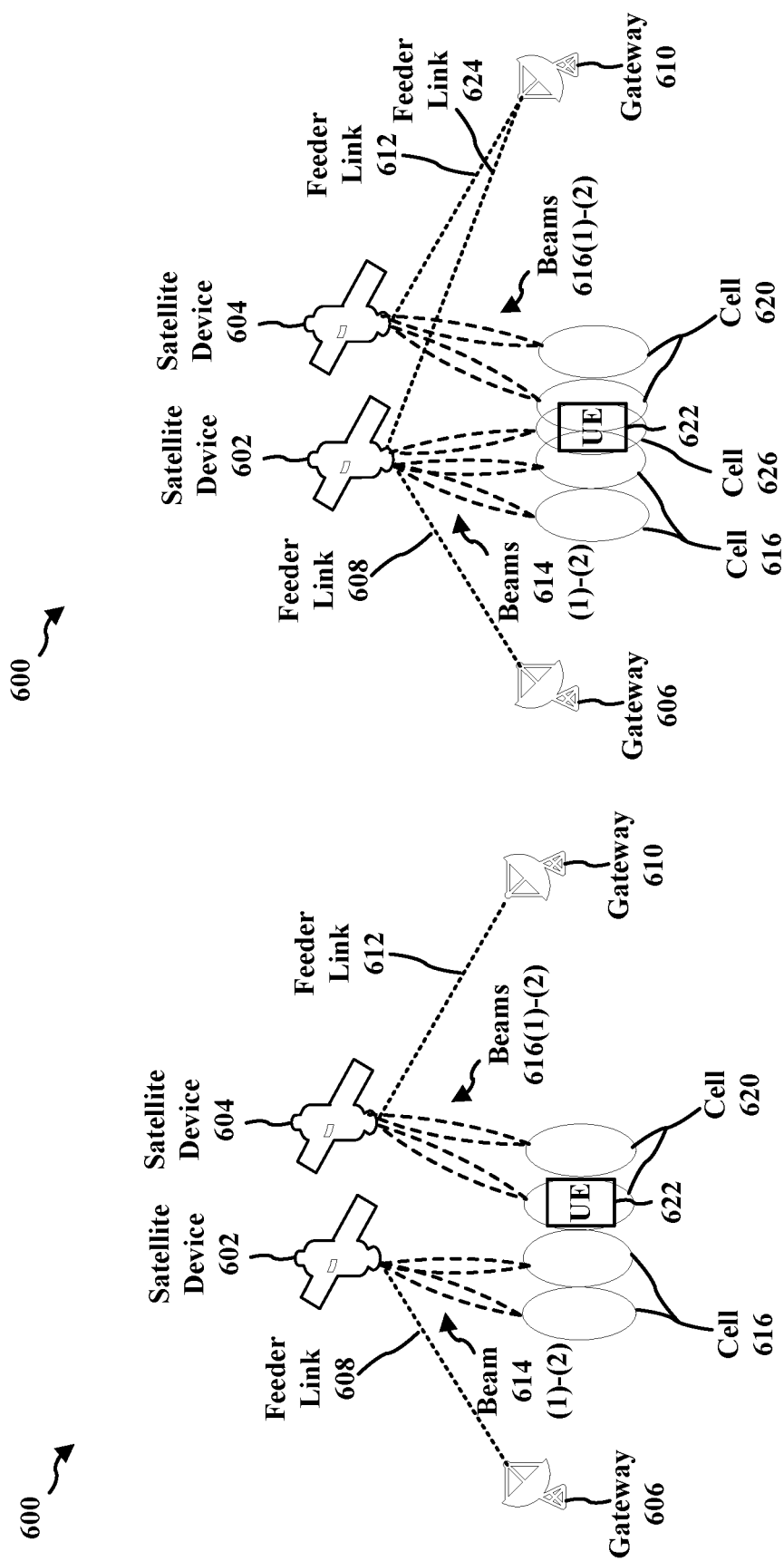
FIG. 6A is a diagram of a first example of a wireless communication network 600 including moving radio cells at a first instance in time, in accordance with some aspects of the present disclosure.
FIG. 6B is a diagram of a first example of a wireless communication network 600 including moving radio cells at a second instance in time, in accordance with some aspects of the present disclosure.

FIG. 6A is a diagram of a first example of a wireless communication network 600 including moving radio cells at a first instance in time, in accordance with some aspects of the present disclosure. As illustrated in FIG. 6A, the wireless communication network 600 may include a satellite device 602 (e.g., the satellite device 402) and a satellite device 604 (e.g., the satellite device 402). Further, the satellite device 602 may be communicatively coupled to a terrestrial network via a gateway 606 (e.g., the gateway 404). For example, the wireless communication network 600 may include a feeder link 608 between the satellite device 602 and the gateway 606. In addition, the satellite device 604 may be communicatively coupled to a terrestrial network via a gateway 610 (e.g., the gateway 404). For example, the wireless communication network 600 may include a feeder link 612 between the satellite device 604 and the gateway 610. Further, the satellite device 602 may form beams 614(1)-(2) associated with the gateway 606 that provide the moving radio cell 616, and the satellite device 604 may form beams 618(1)-(2) associated with the gateway 610 that provide the moving radio cell 620. In addition, at a first instance in time, the UE 622 (e.g., the UE 406) may select the moving radio cell 620 in a cell selection or reselection process.

FIG. 6B is a diagram of a first example of a wireless communication network 600 including moving radio cells at a second instance in time, in accordance with some aspects of the present disclosure. As illustrated in FIG. 6B, in response to movement of the satellite devices 602 and 604, the satellite device 602 may perform a soft feeder link switch. More specifically, the satellite device 602 may additionally be communicatively coupled to the terrestrial network via the gateway 610. Further, the soft feeder switch may occur one beam at a time. For example, the wireless communication network 600 may contemporaneously include the feeder link 608 between the satellite device 602 and the gateway 606, and a feeder link 624 between the satellite device 602 and the gateway 610. Further, the beam 614(2) may contemporaneously provide the moving radio cell 616 and the moving radio cell 626.

As described in detail herein, the UE 622 may receive cell reselection information (e.g., the cell reselection information 414(1)-(N)). Further, the UE 622 may select, based on the cell reselection information via a cell reselection process, the moving radio cell 626 to camp on instead of the moving radio cell 620, which will be performing a gateway switch to the gateway 610 in the near future. In some aspects, the cell reselection information may include configuration information, a DCI, a gateway identifier, and/or mapping information, as described in detail herein. In some other aspects, each beam (e.g., beams 614(1)-(2)) of a satellite device (e.g., the satellite device 602) performs the gateway switch at the same time. In these instances, the UE 622 may perform cell reselection using cell reselection information including configuration information and/or a DCI for a beam switch between beams of the same satellite device, and the UE 622 may perform cell reselection using cell reselection information including a gateway identifier and/or mapping information for a beam switch between beams of different satellite devices and different gateways.

Figure 7B:
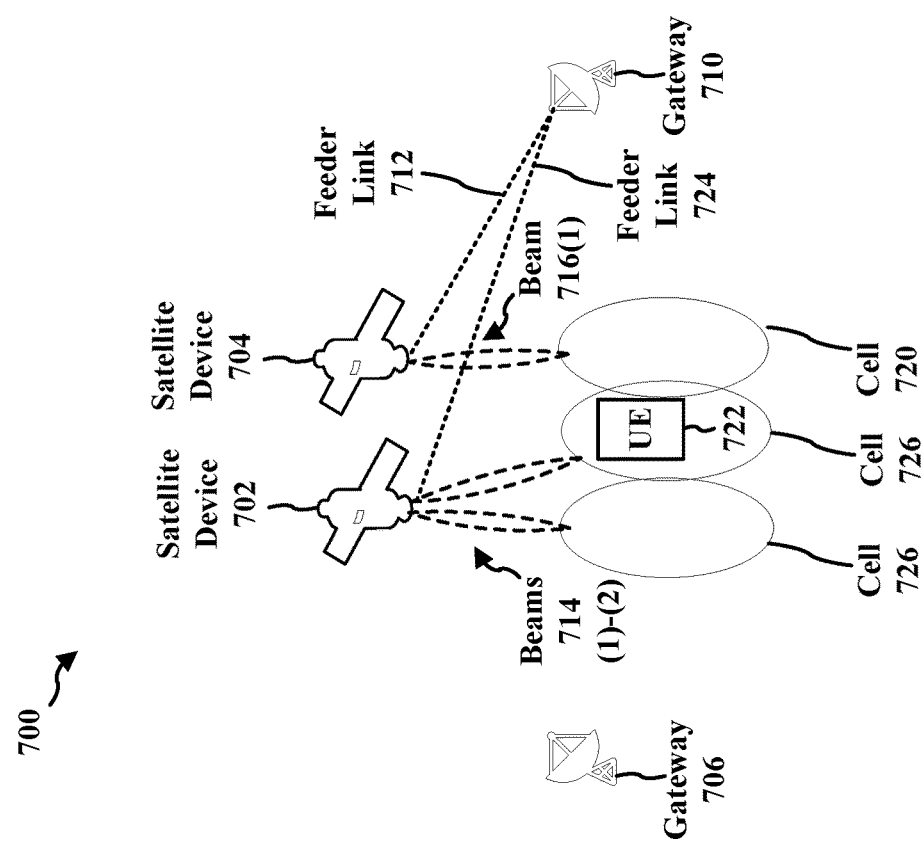
FIG. 7B is a diagram of a second example of a wireless communication network 700 including moving radio cells at a second instance in time, in accordance with some aspects of the present disclosure.
Figure 7A:
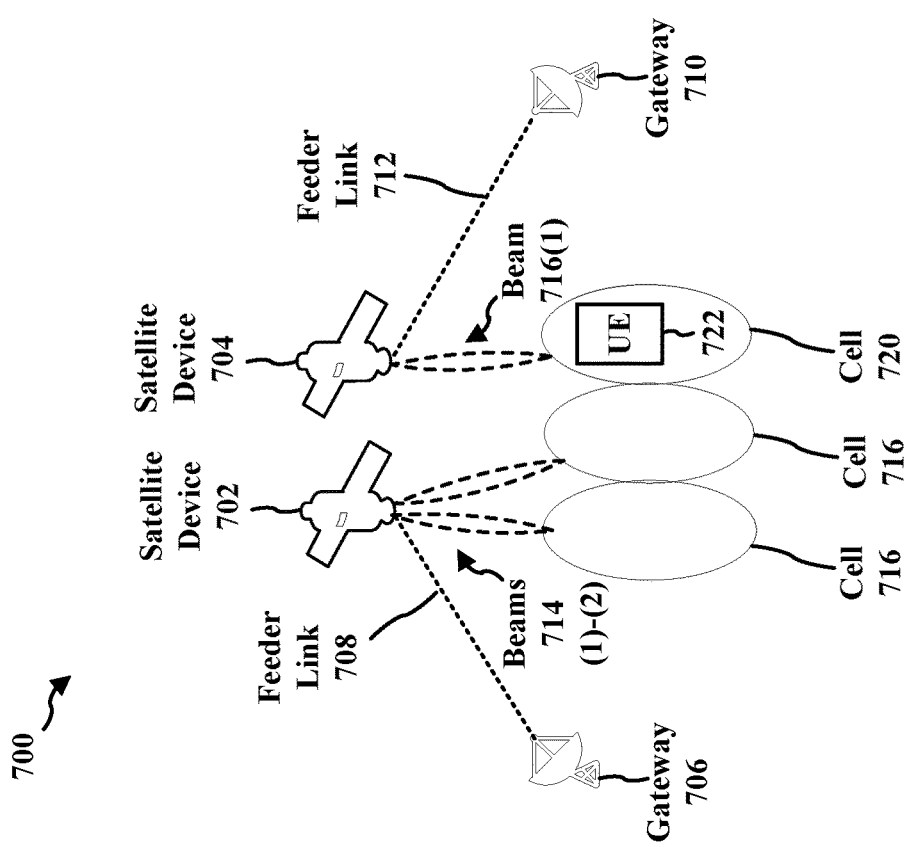
FIG. 7A is a diagram of a second example of a wireless communication network 700 including moving radio cells at a first instance in time, in accordance with some aspects of the present disclosure.

FIG. 7A is a diagram of an example of a wireless communication network 700 including moving radio cells at a first instance in time, in accordance with some aspects of the present disclosure. As illustrated in FIG. 7A, the wireless communication network 700 may include a satellite device 702 (e.g., the satellite device 402) and a satellite device 704 (e.g., the satellite device 402). Further, the satellite device 702 may be communicatively coupled to a terrestrial network via a gateway 706 (e.g., the gateway 404). For example, the wireless communication network 700 may include a feeder link 708 between the satellite device 702 and the gateway 706. In addition, the satellite device 704 may be communicatively coupled to a terrestrial network via a gateway 710 (e.g., the gateway 404). For example, the wireless communication network 700 may include a feeder link 712 between the satellite device 704 and the gateway 710. Further, the satellite device 702 may form beams 714(1)-(2) associated with the gateway 706 that provide the moving radio cell 716, and the satellite device 704 may form beam 718(1) associated with the gateway 710 that provides the moving radio cell 720. In addition, at a first instance in time, the UE 722 (e.g., the UE 406) may select the moving radio cell 720 in a cell selection or reselection process.

FIG. 7B is a diagram of an example of a wireless communication network 700 including moving radio cells at a second instance in time, in accordance with some aspects of the present disclosure. As illustrated in FIG. 7B, in response to movement of the satellite devices 702 and 704, the satellite device 702 may perform a hard feeder link switch. More specifically, the satellite device 702 may be communicatively coupled to the terrestrial network via the gateway 710. Further, the hard feeder link switch may cause disconnection from the gateway 706 and termination of the moving radio cell 716. For example, the wireless communication network 700 may end the feeder link 708 between the satellite device 702 and the gateway 706, and add a feeder link 724 between the satellite device 702 and the gateway 710. Further, the beams 714(1)-(2) may now provide the moving radio cell 726.

As described in detail herein, the UE 722 may receive cell reselection information (e.g., the cell reselection information 414(1)-(N)). Further, the UE 722 may select, based on the cell reselection information via a cell reselection process, the moving radio cell 726 to camp on instead of the moving radio cell 716, which will be terminated in the near future. In some aspects, the cell reselection information may include warning information, scheduling information, configuration information, a DCI, a gateway identifier, and/or mapping information, as described in detail herein. In some other aspects, each moving radio cell (e.g., the moving radio cell 716) may correspond to a single beam (e.g., the beam 714(1)) or each satellite device (e.g., the satellite device 702) may generate a single moving radio cell (e.g., the moving radio cell 716). In these instances, the UE 722 may perform cell reselection using cell reselection information including warning information and/or scheduling information, as described in detail herein.

Figure 8:
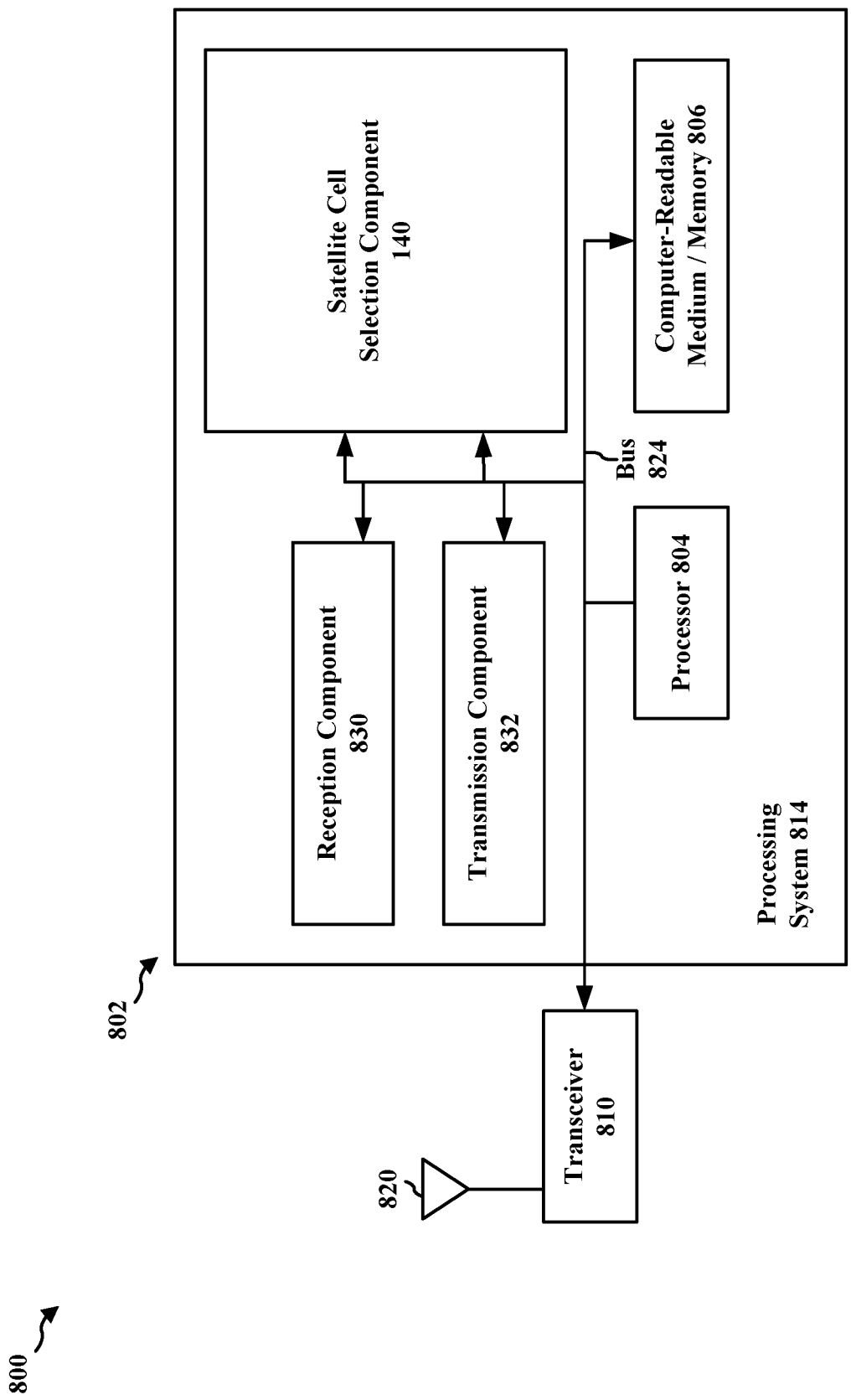
FIG. 8 is a diagram illustrating an example of a hardware implementation for a UE employing a processing system, in accordance with some aspects of the present disclosure.

FIG. 8 is a diagram 800 illustrating an example of a hardware implementation for a UE 802 (e.g., the UE 102, the UE 406, etc.) employing a processing system 814. The processing system 814 may be implemented with a bus architecture, represented generally by the bus 824. The bus 824 may include any number of interconnecting buses and/or bridges depending on the specific application of the processing system 814 and the overall design constraints. The bus 824 links together various circuits including one or more processors and/or hardware components, represented by the processor 804, the satellite cell selection component 140, and the computer-readable medium (e.g., non-transitory computer-readable medium)/memory 806. The bus 824 may also link various other circuits such as timing sources, peripherals, voltage regulators, and power management circuits, which are well known in the art, and therefore, will not be described any further.

The processing system 814 may be coupled with a transceiver 810. The transceiver 810 may be coupled with one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 830. In addition, the transceiver 810 receives information from the processing system 814, specifically the transmitter component 832, and based on the received information, generates a signal to be applied to the one or more antennas 820. The processing system 814 includes a processor 804 coupled with a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 may further includes the satellite cell selection component 140. The component may be a software component running in the processor 804, resident/stored in the computer readable medium/memory 806, one or more hardware components coupled with the processor 804, or some combination thereof. The processing system 814 may be a component of the UE 350 and may include the memory 360 and/or at least one of the TX processor 368, the RX processor 356, and the controller/processor 359. Alternatively, the processing system 814 may be the entire UE (e.g., see 350 of FIG. 3).

The satellite cell selection component 140 may be configured to identify a cell to select and perform a cell reselection process to select the cell. Further, the satellite cell selection component 140 may identify the cell to select based on rules for minimizing or reducing the frequency of cell reselection by the UE 802. In particular, the UE 802 may receive cell reselection information (e.g., the cell reselection information 414(1)-(N)), and identify a cell to select on based on the cell reselection information. As described in detail herein, the cell reselection information may indicate cells or beams likely to be associated with a feeder link modification. As such, the cell reselection information may inform the satellite cell selection component 140 as to which cells would require another cell reselection process in the near future.

The aforementioned means may be one or more of the aforementioned components of the UE 802 and/or the processing system 814 of UE 802 configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
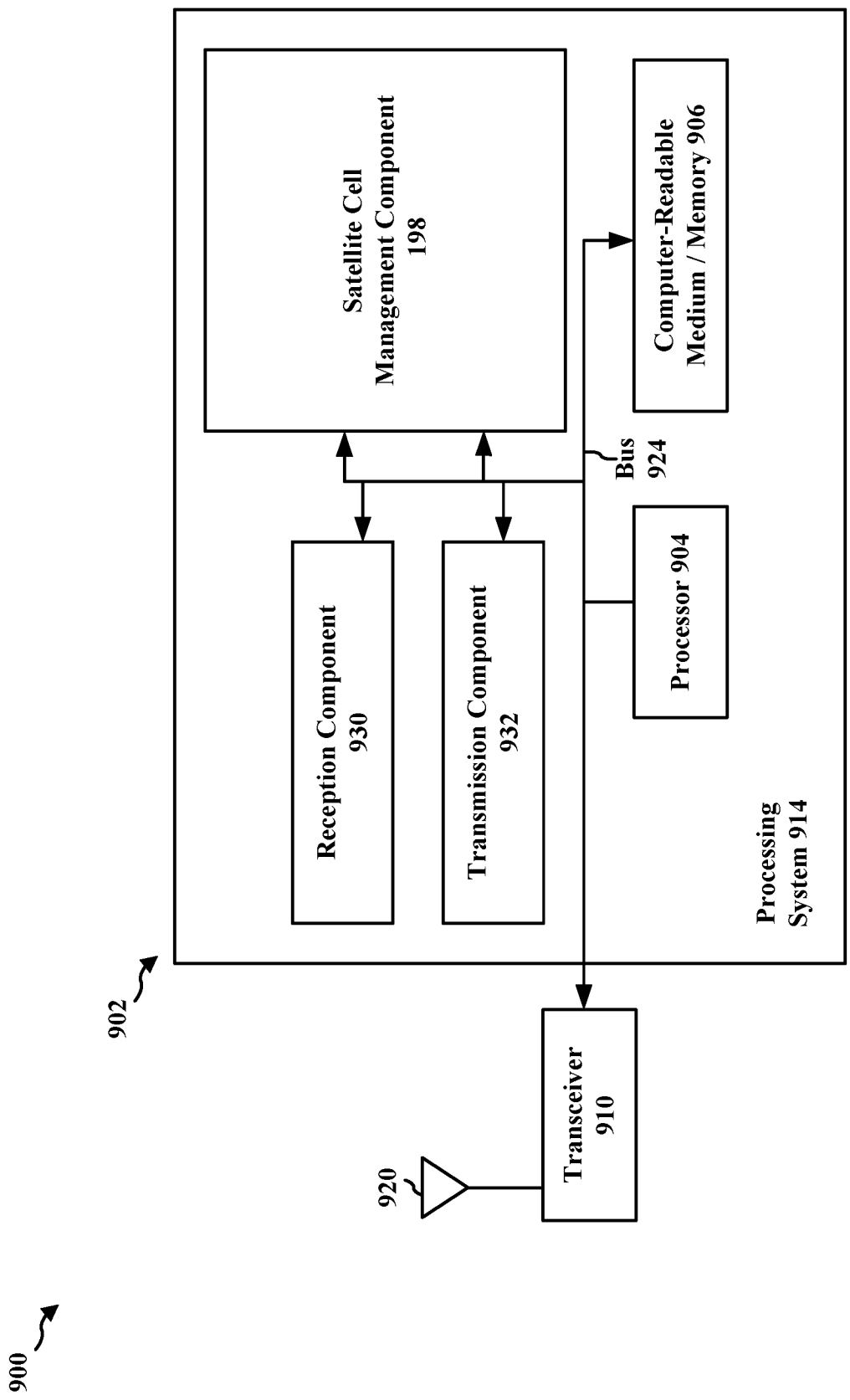
FIG. 9 is a diagram illustrating an example of a hardware implementation for a satellite device employing a processing system, in accordance with some aspects of the present disclosure.

FIG. 9 is a diagram 900 illustrating an example of a hardware implementation for a satellite device 902 (e.g., the satellite device 402, etc.) employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the satellite cell management component 198, and the computer-readable medium (e.g., non-transitory computer-readable medium)/memory 908. The bus 924 may also link various other circuits such as timing sources, peripherals, voltage regulators, and power management circuits, which are well known in the art, and therefore, will not be described any further.

The processing system 914 may be coupled with a transceiver 910. The transceiver 910 may be coupled with one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 930. In addition, the transceiver 910 receives information from the processing system 914, specifically the transmission component 932, and based on the received information, generates a signal to be applied to the one or more antennas 920. The processing system 914 includes a processor 904 coupled with a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes the satellite cell management component 198. The component may be a software component running in the processor 904, resident/stored in the computer readable medium/memory 906, one or more hardware components coupled with the processor 904, or some combination thereof. The processing system 914 may be a component of the base station 310 and may include the memory 376 and/or at least one of the TX processor 316, the RX processor 370, and the controller/processor 375. Alternatively, the processing system 914 may be the entire base station (e.g., see 310 of FIG. 3).

The satellite cell management component 198 may be configured to facilitate efficient cell reselection of beams and cells of a satellite device. In particular, the satellite cell management component 198 may generate cell reselection information (e.g., the cell reselection information 414(1)-(N)), and send the cell reselection information to UEs. As described in detail herein, the cell reselection information may indicate cells or beams of the satellite likely to be associated with a feeder link modification. As such, the cell reselection information may inform the UEs as to which cells of the satellite device 902 or another satellite device would require another cell reselection process in the near future.

The aforementioned means may be one or more of the aforementioned components of the satellite device 902 and/or the processing system 914 of the satellite device 902 configured to perform the functions recited by the aforementioned means. As described supra, the processing system 914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 10:
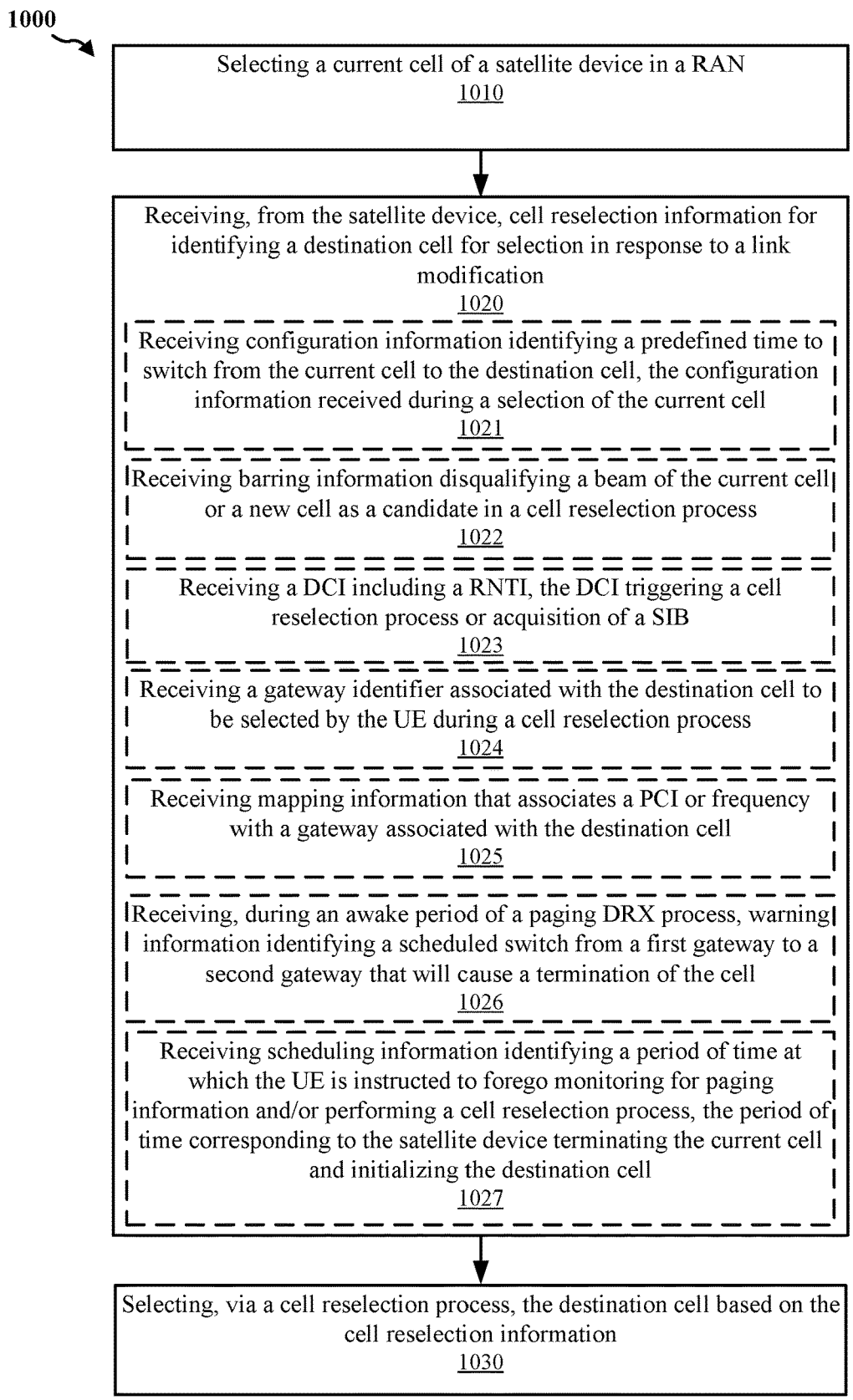
FIG. 10 is a flowchart of an example method of cell reselection during a gateway and/or satellite switch by a UE, in accordance with some aspects of the present disclosure.

FIG. 10 is a flowchart of a method 1000 of cell reselection during a gateway and/or satellite switch, in accordance with some aspects of the present disclosure. The method may be performed by a UE (e.g., the UE 104 of FIGS. 1 and 3, which may include the memory 360 and which may be the entire UE 104 or a component of the UE 104, such as the satellite cell selection component 140, the TX processor 368, the RX processor 356, and/or the controller/processor 359; the UE 406 of FIG. 4; and/or the UE 802 of FIG. 8).

At block 1010, the method 1000 includes selecting a current cell of a satellite device in a RAN. For example, the UE 406(1) may select the cell 412(1) provided by the satellite device 402(1). In some aspects, the UE 406(1) may camp on the cell 412(1) in an RRC idle mode.

Accordingly, the UE 104, the UE 406, UE 802, the TX processor 368, the RX processor 356, and/or the controller/processor 359, executing the satellite cell selection component 140 may provide means for selecting a current cell of a satellite device in a RAN.

At block 1020, the method 1000 may include receiving, from the satellite device, cell reselection information for identifying a destination cell for selection in response to a link modification (e.g., gateway change, satellite handover, etc.). For example, the satellite cell selection component 140 may receive the cell reselection information 414(1) from the satellite device 402(1). Further, the satellite cell selection component 140 may employ the cell reselection information 414(1) to determine a destination cell 412. As described in detail herein, the satellite cell selection component 140 may be configured to select a destination cell 412 that minimizes or reduces the frequency of cell reselection processes performed by the UE 406(1).

At sub-block 1021, the block 1020 may optionally include receiving configuration information identifying a predefined time to switch from the current cell to the destination cell, the configuration information received during a selection of the current cell. For example, the cell reselection information 414(1)-(N) may include configuration information identifying a predefined period of time to switch from a current cell 412(3) to a destination cell 412(2).

At sub-block 1022, the block 1020 may optionally include receiving barring information disqualifying a beam of the current cell or a new cell as a candidate in a cell reselection process. For example, the cell reselection information 414(1)-(N) may include barring information identifying a beam 410 or cell 412 that the UE 406(1) should not select during a cell reselection process.

At sub-block 1023, the block 1020 may optionally include receiving a Downlink control information (DCI) including a radio network temporary identifier (RNTI), the DCI triggering a cell reselection process or acquisition of a system information block (SIB). For example, the cell reselection information 414(1)-(N) may include a DCI that triggers a cell reselection process or acquisition of a SIB that may be used to select a cell 412.

At sub-block 1024, the block 1020 may optionally include receiving a gateway identifier associated with the destination cell to be selected by the UE during a cell reselection process. For example, the cell reselection information 414(1)-(N) may include a gateway identifier associated with the destination cell 412 to be selected by the UE 406(1) during a cell reselection process.

At sub-block 1025, the block 1020 may optionally include receiving mapping information that associates a PCI or frequency with a gateway associated with the destination cell. For example, the cell reselection information 414(1)-(N) may include mapping information identifying an association between a PCI or a frequency with a gateway identifier associated with the destination cell 412 to be selected by the UE 406(1) during a cell reselection process.

At sub-block 1026, the block 1020 may optionally include receiving, during an awake period of a paging discontinuous reception (paging DRX) process, warning information identifying a scheduled switch from a first gateway to a second gateway that will cause a termination of the cell. For example, the cell reselection information 414(1)-(N) may include warning information identifying a scheduled gateway switch from a first gateway 404 to a second gateway 404 that will cause a termination of a cell 412. Further, the UE 406(1) may receive the warning information during an awake period of paging discontinuous reception (DRX) process At sub-block 1027, the block 1020 may optionally include receiving scheduling information identifying a period of time at which the UE is instructed to forego monitoring for paging information and/or performing a cell reselection process, the period of time corresponding to the satellite device terminating the current cell and initializing the destination cell. For example, the cell reselection information 414(1)-(N) may include scheduling information identifying a period of time at which the UE 406(1) is instructed to forego monitoring for paging information and/or performing a cell reselection process.

Accordingly, the UE 104, the UE 406, UE 802, the TX processor 368, the RX processor 356, and/or the controller/processor 359 executing the satellite cell selection component 140 may provide means for receiving, from the satellite device, cell reselection information for identifying a destination cell for selection in response to a link modification.

At block 1030, the method 1000 may include selecting, via a cell reselection process, the destination cell based on the cell reselection information. For example, the UE 406(1) may switch to the destination cell 412(2) in response to a cell reselection process performed in view of the cell reselection information 414(1)-(N).

Accordingly, the UE 104, the UE 406, UE 802, the TX processor 368, the RX processor 356, and/or the controller/processor 359 executing the satellite cell selection component 140 may provide means for selecting, via a cell reselection process, the destination cell based on the cell reselection information.

Figure 11:
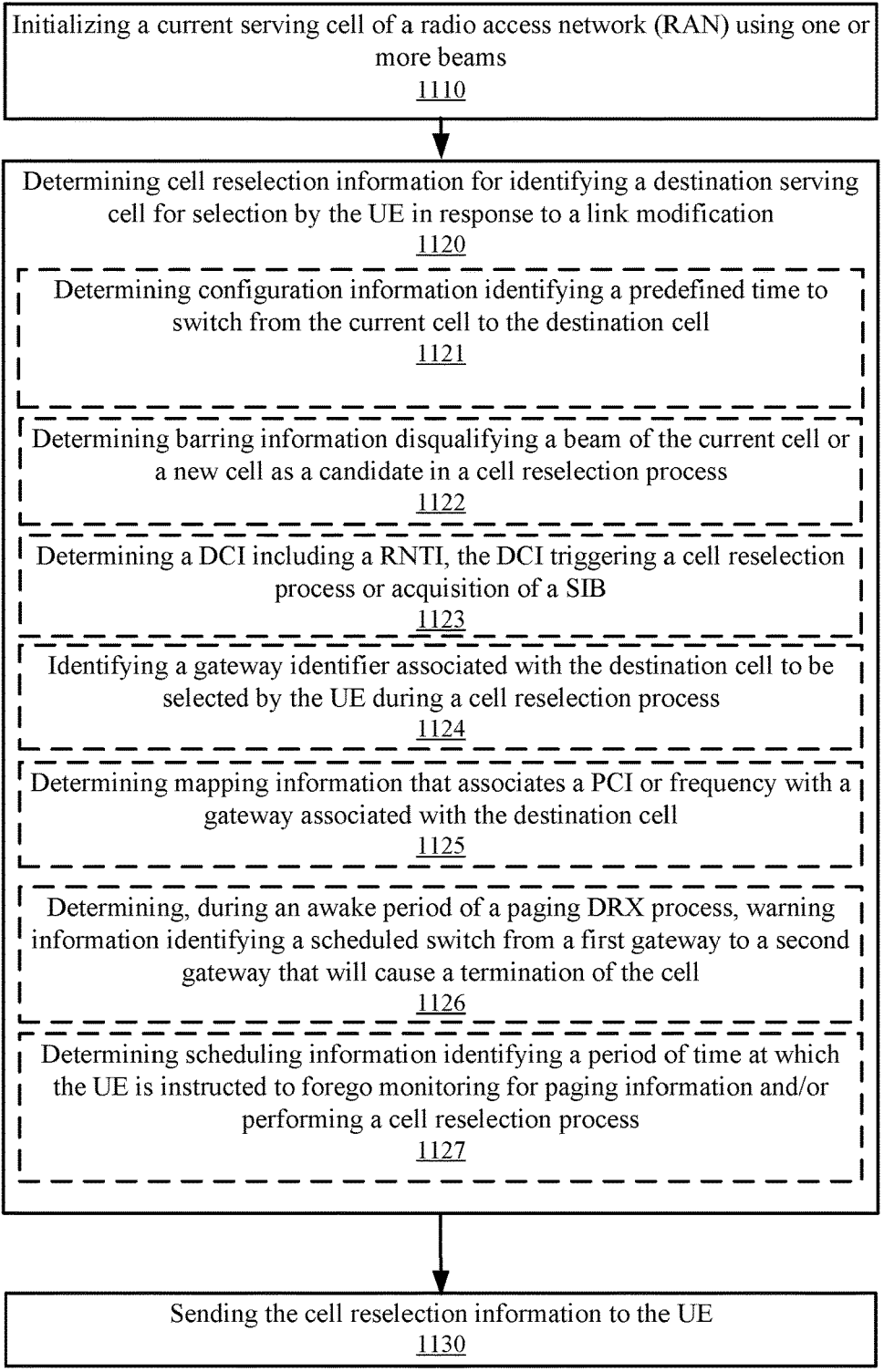
FIG. 11 is a flowchart of a method of facilitating cell reselection during a gateway and/or satellite switch by a base station, in accordance with some aspects of the present disclosure.

FIG. 11 is a flowchart of a method 1100 of facilitating cell reselection during a gateway and/or satellite switch, in accordance with some aspects of the present disclosure. The method may be performed by a base station (e.g., the base station 102/180 of FIGS. 1 and 3, which may include the memory 376 and which may be the entire base station or a component of the base station, such as satellite cell management component 198, the TX processor 316, the RX processor 370, and/or the controller/processor 375; the satellite device 402 of FIG. 4; the satellite device 902 of FIG. 9.

At block 1110, the method 1100 may include initializing a current serving cell of a radio access network (RAN) using one or more beams. For example, the satellite device 402(1) may form a beam 410(1) that generates a cell 412(1) for providing coverage to the UEs 406(1)-(N). Further, the UE 406(1) may select the cell 412(1) and operate in an idle mode.

Accordingly, the base station 102, the satellite device 402, the satellite device 902, the TX processor 316, the RX processor 370, and/or the controller/processor 375 executing the satellite cell management component 198 may provide means for initializing a current serving cell of a radio access network (RAN) using one or more beams.

At block 1120, the method 1100 may include determining cell reselection information for identifying a destination serving cell for selection by the UE in response to a link modification. For example, the satellite cell management component 198 may generate the cell reselection information 414(1) based on the satellite configuration information 416. As described in detail herein, the UE 406(1) may employ the cell reselection information 414(1) to select a destination cell 412 that minimizes the frequency of cell reselection processes performed by the UE 406(1).

At sub-block 1121, the block 1120 may optionally include determining configuration information identifying a predefined time to switch from the current cell to the destination cell, the configuration information received during a selection of the current cell. For example, the cell reselection information 414(1) may include configuration information identifying a predefined period of time to switch from a current cell 412(3) to a destination cell 412(2).

At sub-block 1122, the block 1120 may optionally include determining barring information disqualifying a beam of the current cell or a new cell as a candidate in a cell reselection process. For example, the cell reselection information 414(1) may include barring information identifying a beam 410 or cell 412 that the UE 406(1) should not select during a cell reselection process.

At sub-block 1123, the block 1120 may optionally include determining a DCI including a radio network temporary identifier (RNTI), the DCI triggering a cell reselection process or acquisition of a SIB. For example, the cell reselection information 414(1) may include a DCI that triggers a cell reselection process or acquisition of a SIB that may be used to select a cell 412.

At sub-block 1124, the block 1120 may optionally include determining a gateway identifier associated with the destination cell to be selected by the UE during a cell reselection process. For example, the cell reselection information 414(1) may include a gateway identifier associated with the destination cell 412 to be selected by the UE 406(1) during a cell reselection process.

At sub-block 1125, the block 1120 may optionally include determining mapping information that associates a PCI or frequency with a gateway associated with the destination cell. For example, the cell reselection information 414(1) may include mapping information identifying an association between a PCI or a frequency with a gateway identifier associated with the destination cell 412 to be selected by the UE 406(1) during a cell reselection process.

At sub-block 1126, the block 1120 may optionally include determining, during an awake period of a paging discontinuous reception (DRX) process, warning information identifying a scheduled switch from a first gateway to a second gateway that will cause a termination of the cell. For example, the cell reselection information 414(1) may include warning information identifying a scheduled gateway switch from a first gateway 404 to a second gateway 404 that will cause a termination of a cell 412. Further, the UE 406(1) may receive the warning information during an awake period of paging discontinuous reception (DRX) process At sub-block 1127, the block 1120 may optionally include determining scheduling information identifying a period of time at which the UE is instructed to forego monitoring for paging information and/or performing a cell reselection process, the period of time corresponding to the satellite device terminating the current cell and initializing the destination cell. For example, the cell reselection information 414(1) may include scheduling information identifying a period of time at which the UE 406(1) is instructed to forego monitoring for paging information and/or performing a cell reselection process.

Accordingly, base station 102, the satellite device 402, the satellite device 902, the TX processor 316, the RX processor 370, and/or the controller/processor 375 executing the satellite cell management component 198 may provide means for determining cell reselection information for identifying a destination serving cell for selection by the UE in response to a link modification.

At block 1130, the method 1100 may include sending the cell reselection information to the UE. For example, the satellite device 402(1) may send the cell reselection information 414(1) to the UE 406(1).

Accordingly, base station 102, the satellite device 402, the satellite device 902, the TX processor 316, the RX processor 370, and/or the controller/processor 375 executing the satellite cell management component 198 may provide means for sending the cell reselection information to the UE.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person having ordinary skill in the art to practice the various aspects described herein. Various modifications to these aspects will be readily apparent to a person having ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Clauses

A. A method of wireless communication at a user equipment (UE), comprising: selecting a current cell of a satellite device in a radio access network (RAN); and receiving, from the satellite device, cell reselection information for identifying a destination cell for selection in response to a link modification.

B. The method as paragraph A recites, further comprising selecting, via a cell reselection process, the destination cell based on the cell reselection information.

C. The method as any of paragraphs A-B recite, wherein the current cell is the destination cell, and further comprising switching, during a cell reselection process, from a first beam of the current cell to a second beam of the current cell based on the cell reselection information.

D. The method as any of paragraphs A-B recite, wherein the current cell is different from the destination cell, and further comprising switching, during a cell reselection process, from a first beam of the current cell to a second beam of the destination cell based on the cell reselection information.

E. The method as any of paragraphs A-D recite, wherein receiving the cell reselection information comprises receiving configuration information identifying a predefined time to switch from the current cell to the destination cell, the configuration information received during a selection of the current cell.

F. The method as any of paragraphs A-D recite, wherein receiving the cell reselection information comprises receiving barring information disqualifying a beam of the current cell or another cell as a candidate in a cell reselection process.

G. The method as any of paragraphs A-D recite, wherein receiving the cell reselection information comprises receiving downlink control information (DCI) including a radio network temporary identifier (RNTI), the DCI triggering a cell reselection process or acquisition of a system information block (SIB).

H. The method as any of paragraphs A-D recite wherein receiving the cell reselection information comprises receiving a gateway identifier associated with the destination cell to be selected by the UE during a cell reselection process.

I. The method as any of paragraphs A-D recite, wherein receiving the cell reselection information comprises receiving mapping information that associates a physical cell identifier (PCI) or frequency with a gateway associated with the destination cell.

J1. The method as any of paragraphs A-D recite, wherein receiving the cell reselection information comprises receiving, during an awake period of a paging discontinuous reception (DRX) process, warning information identifying a scheduled switch from a first gateway to a second gateway that will cause a termination of the current cell.

J2. The method as any of paragraphs A-D recite, wherein receiving the cell reselection information comprises: receiving, timing information identifying a scheduled switch from a first gateway to a second gateway that will cause a reselection of the current cell belonging to the satellite device.

K. The method as any of paragraphs A-J2 recite, further comprising acquiring a system information block based on the warning information.

L. The method as any of paragraphs A-K recite, further comprising delaying or deprioritizing the selection of the destination cell based on the cell reselection information.

M. The method as any of paragraphs A-D recite, wherein receiving the cell reselection information comprises receiving scheduling information identifying a period of time at which the UE is instructed to forego monitoring for paging information and/or performing a cell reselection process, the period of time corresponding to the satellite device terminating the current cell and initializing the destination cell.

N. The method as any of paragraphs A-D recite, wherein receiving the cell reselection information comprises at least one of the following receiving a system information block (SIB) or dedicated radio resource control (RRC) signaling including the cell reselection information; receiving a master information block (MIB) including the cell reselection information; or receiving a synchronization signal block (SSB) including the cell reselection information.

O. The method as any of paragraphs A-N recite, wherein the link modification comprises at least one of the following a soft or hard feeder link modification of the satellite device; or a service link modification at the UE P. The method as any of paragraphs A-D recite, wherein the RAN is a 5G New Radio RAN.

Q. A UE, comprising a memory storing computer-executable instructions; and at least one processor coupled with the memory and configured to execute the computer-executable instructions to perform the method of any of paragraphs A-P.

R. A UE, comprising means for performing the method of any of paragraphs A-P.

S. A non-transitory computer-readable medium storing computer executable code, the code when executed by a processor causes the processor to perform the method of any of paragraphs A-P.

T. A method of wireless communication at a satellite device, comprising: initializing a current cell of a radio access network (RAN) using one or more beams; determining cell reselection information for identifying a destination cell for selection by the UE in response to a link modification; and sending the cell reselection information to the UE.

U. The method as paragraph T recites, wherein determining the cell reselection information comprises determining configuration information identifying a predefined time to switch from the current cell to the destination cell, and sending the cell reselection information comprises sending the configuration information during a selection of the current cell by the UE.

V. The method as paragraph T recites, wherein determining the cell reselection information comprises determining barring information disqualifying a beam of the current cell as a candidate in a cell reselection process, the beam associated with another satellite device.

W. The method as paragraph T recites, wherein determining the cell reselection information comprises determining downlink control information (DCI) including a radio network temporary identifier (RNTI), the DCI triggering a cell reselection process or acquisition of a system information block (SIB).

X. The method as paragraph T recites, wherein determining the cell reselection information comprises identifying a gateway identifier associated with the destination cell to be selected by the UE during a cell reselection process.

Y. The method as paragraph T recites, wherein determining the cell reselection information comprises identifying mapping information that associates a physical cell identifier (PCI) or frequency with a gateway associated with the destination cell.

Z. The method as paragraph T recites, wherein determining the cell reselection information comprises determining warning information identifying a scheduled switch from a first gateway to a second gateway that will cause a termination of the current cell, and sending the cell reselection information comprises sending the warning information during an awake period of a paging discontinuous reception (DRX) process.

AA. The method as paragraph T recites, wherein determining the cell reselection information comprises determining scheduling information identifying a period of time at which the UE is instructed to forego monitoring for paging information and/or performing a cell reselection process.

AB. The method as any of paragraphs T-AA recite, further comprising terminating the current cell and initializing the destination cell during the period of time.

AC. The method as any of paragraphs T-AB recite, wherein sending the cell reselection information comprises at least one of the following sending a system information block (SIB) or dedicated radio resource control (RRC) signaling including the cell reselection information; sending a master information block (MIB) including the cell reselection information; or sending a synchronization signal block (SSB) including the cell reselection information.

AD. The method as any of paragraphs T-AC recite, wherein the link modification comprises at least one of the following a soft or hard feeder link modification of the satellite device; or a service link modification at the UE.

AE. The method as any of paragraphs T-AD recite, wherein initializing the current cell of the RAN comprises initializing a fixed temporary radio cell that performs hard switching or soft switching.

AF. The method as any of paragraphs T-AE recite, wherein initializing the current cell of the RAN comprises initializing a moving radio cell that performs hard switching or soft switching.

AG. The method as any of paragraphs T-AF recite, further comprising initializing the destination cell based on switching from a first gateway to a second gateway.

AH. The method as any of paragraphs T-AG recite, further comprising initializing the destination cell based on switching from a first gateway to a second gateway.

AI. The method as any of paragraphs T-AH recite, wherein the RAN is a 5G New Radio RAN.

AJ. A satellite device, comprising a memory storing computer-executable instructions; and at least one processor coupled with the memory and configured to execute the computer-executable instructions to perform the method of any of paragraphs T-AI.

AK. A satellite device, comprising means for performing the method of any of paragraphs T-AI.

AL. A non-transitory computer-readable medium storing computer executable code, the code when executed by a processor causes the processor to perform the method of any of paragraphs T-AI.

What is claimed is:

1. A method of wireless communication at a user equipment (UE), comprising:
    selecting a current cell of a satellite device in a radio access network (RAN); and
    receiving, from the satellite device, cell reselection information for identifying a destination cell for selection in response to a service link modification or a gateway link modification,
    wherein receiving the cell reselection information comprises receiving barring information disqualifying one or more beams of the current cell or another cell as a candidate in a cell reselection process.

2. The method of claim 1, further comprising:
    selecting, via a cell reselection process, the destination cell based on the cell reselection information.

3. The method of claim 1, wherein the current cell is the destination cell, and further comprising:
    switching, during a cell reselection process, from a first beam of the current cell to a second beam of the current cell based on the cell reselection information.

4. The method of claim 1, wherein the current cell is different from the destination cell, and further comprising:
    switching, during a cell reselection process, from a first beam of the current cell to a second beam of the destination cell based on the cell reselection information.

5. The method of claim 1, wherein receiving the cell reselection information comprises:
    receiving information identifying a predefined time to switch from the current cell to the destination cell.

6. The method of claim 1, wherein receiving the cell reselection information comprises:
    receiving downlink control information (DCI) including a radio network temporary identifier (RNTI), the DCI triggering a cell reselection process or acquisition of a system information block (SIB).

7. The method of claim 1, wherein receiving the cell reselection information comprises:
    receiving a gateway identifier associated with the destination cell to be selected by the UE during a cell reselection process.

8. The method of claim 1, wherein receiving the cell reselection information comprises:
    receiving mapping information that associates a physical cell identifier (PCI) or frequency or propagation delay information or uplink and downlink timing difference information with a gateway associated with the destination cell.

9. The method of claim 1, wherein receiving the cell reselection information comprises:
    receiving, during an awake period of a paging discontinuous reception (DRX) process, warning information identifying a scheduled switch from a first gateway to a second gateway that will cause a termination of the current cell.

10. The method of claim 1, wherein receiving the cell reselection information comprises:
    receiving, timing information identifying a scheduled switch from a first gateway to a second gateway that will cause a reselection of the current cell belonging to the satellite device.

11. The method of claim 1, further comprising delaying or deprioritizing the selection of the destination cell based on the cell reselection information.

12. The method of claim 1, wherein receiving the cell reselection information comprises:
    receiving scheduling information identifying a period of time at which the UE is instructed to suspend monitoring for paging information or performing a cell reselection process, the period of time corresponding to the satellite device terminating the current cell and initializing the destination cell.

13. The method of claim 1, wherein receiving the cell reselection information comprises at least one of:
    receiving a system information block (SIB) or dedicated radio resource control (RRC) signaling including the cell reselection information;

receiving a master information block (MIB) including the cell reselection information; or receiving a synchronization signal block (SSB) including the cell reselection information.

14. A user equipment (UE) for wireless communication, comprising:
   a memory storing computer-executable instructions; and
   at least one processor coupled with the memory and configured to execute the computer-executable instructions to:
      select a current cell of a satellite device in a radio access network (RAN); and
      receive, from the satellite device, cell reselection information for identifying a destination cell for selection in response to a service link modification or a gateway link modification, wherein the cell reselection information comprises barring information disqualifying one or more beams of the current cell or another cell as a candidate in a cell reselection process.

15. A method of wireless communication at a satellite device, comprising:
   initializing a current cell of a radio access network (RAN) using one or more beams;
   determining cell reselection information for identifying a destination cell for selection by a user equipment (UE) in response to a service link modification or a gateway link modification; and
   sending the cell reselection information to the UE, wherein the cell reselection information comprises barring information disqualifying one or more beams of the current cell or another cell as a candidate in a cell reselection process.

16. The method of claim 15, wherein determining the cell reselection information comprises determining configuration information identifying a predefined time to switch from the current cell to the destination cell, and sending the cell reselection information comprises sending the configuration information during a selection of the current cell by the UE.

17. The method of claim 15, wherein determining the cell reselection information comprises:
   determining downlink control information (DCI) including a radio network temporary identifier (RNTI), the DCI triggering a cell reselection process or acquisition of a system information block (SIB).

18. The method of claim 15, wherein determining the cell reselection information comprises:
   identifying a gateway identifier associated with the destination cell to be selected by the UE during a cell reselection process.

19. The method of claim 15, wherein determining the cell reselection information comprises:
   identifying mapping information that associates a physical cell identifier (PCI) or frequency or propagation delay information or uplink and downlink timing difference information with a gateway associated with the destination cell.

20. The method of claim 15, wherein determining the cell reselection information comprises determining warning information identifying a scheduled switch from a first gateway to a second gateway that will cause a termination of the current cell, and sending the cell reselection information comprises sending the warning information during an awake period of a paging discontinuous reception (DRX) process.

21. The method of claim 15, wherein determining the cell reselection information comprises:
   determining scheduling information identifying a period of time at which the UE is instructed to suspend monitoring for paging information or performing a cell reselection process.

22. The method of claim 15, wherein sending the cell reselection information comprises at least one of:
   sending a system information block (SIB) or dedicated radio resource control (RRC) signaling including the cell reselection information;
   sending a master information block (MIB) including the cell reselection information; or
   sending a synchronization signal block (SSB) including the cell reselection information.

23. The method of claim 15, wherein initializing the current cell of the RAN comprises initializing a fixed temporary radio cell that performs hard switching or soft switching.

24. The method of claim 15, wherein initializing the current cell of the RAN comprises initializing a moving radio cell that performs hard switching or soft switching.

25. The method of claim 15, further comprising initializing the destination cell based on switching from a first gateway to a second gateway.

26. A satellite device for wireless communication, comprising:
   a memory storing computer-executable instructions; and
   at least one processor coupled with the memory and configured to execute the computer-executable instructions to:
      initialize a current cell of a radio access network (RAN) using one or more beams;
      determine cell reselection information for identifying a destination cell for selection by a user equipment (UE) in response to detection of a service link modification or a gateway link modification; and
      send the cell reselection information to the UE, wherein the cell reselection information comprises barring information disqualifying one or more beams of the current cell or another cell as a candidate in a cell reselection process.

* * * * *